Feb. 3, 1970  M. M. EDWARDS ET AL  3,493,214
ELECTRIC BLENDER
Filed March 25, 1968

Inventors:
Margaret M. Edwards
Lauren O. Main
By Robert W. Dudley
Atty

Inventors:
Margaret M. Edwards
Lauren O. Main
By Robert W. Dudley
Atty

United States Patent Office 3,493,214
Patented Feb. 3, 1970

3,493,214
ELECTRIC BLENDER
Margaret M. Edwards, Milwaukee, and Lauren O. Main, Brown Deer, Wis., assignors to John Oster Manufacturing Co., Milwaukee, Wis., a corporation of Wisconsin
Filed Mar. 25, 1968, Ser. No. 715,698
Int. Cl. B01f 7/16
U.S. Cl. 259—108    13 Claims

ABSTRACT OF THE DISCLOSURE

An electric blender having an inverted, cup-shaped base cover formed from thin sheet metal and enclosing an electric motor which is vertically disposed with a driver extending upwardly through the cover. A holder for supporting a mixing vessel is mounted on the top of the cover, and the motor is rigidly fastened to the holder so that the driver is fixedly positioned with respect to the holder. The connection between the holder and the vessel permits the vessel to move laterally so that an agitator within the vessel can be placed in alignment with the driver to establish a power transmission connection therewith. A base plate is attached to the motor and encloses the bottom of the cover. The plate is formed to deter the recirculation of motor cooling air and to strengthen the cover.

BACKGROUND OF THE INVENTION

The present invention relates to electric blenders and, more particularly, to an improved blender which is easily and inexpensively manufactured.

In recent years, electric blenders have gained in popularity due to their ability to perform many laborious operations in the preparation of foods and beverages and to simplify the seriving of many novelty dishes. As blenders increased in popularity, many special features have been incorporated in their design to multiply their usefulness but thereby have increased their cost. With the expanding blender market, there has been a need for a simplified blender which is easily and inexpensively manufactured for those who wish to enjoy most of the advantages of an expensive blender without its high cost. Therefore, there is a definite need for a low cost blender which functions satisfactorily and is safe to use.

It is customary to make blenders with a heavy, expensive base to which the electric motor is attached. Some sort of holder is secured to the top of the base for receiving and supporting a readily removable mixing vessel containing a rotatable agitator. Since the motor driver extends into the holder for making a power transmitting engagement with the vessel agitator, some provision is necessary to insure the proper alignment between these two important elements. To overcome this problem, the motor driver has a floating mounting arrangement so that it may be moved laterally to make a proper engagement with the vessel agitator. However, since the driver has a somewhat limited lateral movement, a good fit is necessary between the holder and the lower portion of the vessel to locate within reasonable limits the agitator with respect to the driver. This construction is, obviously, expensive.

It would be advantageous to have a blender fabricated with a light, inexpensive base cover formed from relatively thin sheet metal upon which the motor is not relying for its support or orientation. Furthermore, it would be highly desirable for the motor to be rigidly mounted without any expensive floating connection and for no close assembly tolerances required between the lower portion of the vessel and the holder to locate the motor driver in proper alignment with the vessel agitator. With this design, the thin flexible base cover would not be relied upon for supporting or locating purposes but would be limited to the sole function of providing an ornamental cover for the internal mechanism.

With the increased emphasis being placed on safety with regard to the operation of electrical appliances, it would be exemplary if the low cost blender could use a thin, metallic base cover which is attractive and easily cleaned and, at the same time, provide a unit which is double insulated electrically so that no exposed metal or electrically conductive part is in direct contact with the electric motor or other electrical component.

In order for the electric motor which is enclosed within the base cover to be effectively cooled by ambient air, the cooling air leaving the blender should be deterred from recirculating through the inlet air opening leading to the motor, and the design within the unit should be such that the incoming and outgoing air should not commingle.

SUMMARY OF THE INVENTION

The present invention relates to an electric blender having a cover enclosing an electric motor provided with a driver extending upwardly through the cover. Mounted on the top of the cover is a holder, and the motor is rigidly anchored thereto so that the driver is fixedly positioned with respect to the holder. The holder is formed with a cavity into which the bottom portion of the mixing vessel is inserted and can be supported so that an agitator in the vessel is in power transmission relationship with the driver. The vessel is adapted for lateral movement while supported by the holder whereby the agitator can be aligned with the driver for proper engagement therebetween. A bottom plate is attached to the motor for supporting the blender and for adding rigidity to the base cover.

Accordingly, it is an object of the present invention to provide an improved electric blender which is inexpensive and easily manufactured.

Another object of the present invention is to provide an improved electric blender which has an inexpensive base cover formed of thin sheet metal which is not relied upon for orienting the mixing vessel with respect to the motor drive or for supporting the blender.

Still a further object of the present invention is to provide an improved blender wherein the motor drive is rigidly positioned with respect to the mixing vessel holder, and means are provided for inexpensively orienting the vessel to the driver for insuring a proper power transmitting relationship therebetween.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWING

For a better understanding of the present invention, reference may be had to the accompanying drawing in which.

DESCRIPTION OF THE PREFERRED EMBODIMENT

Figures 1, 2:
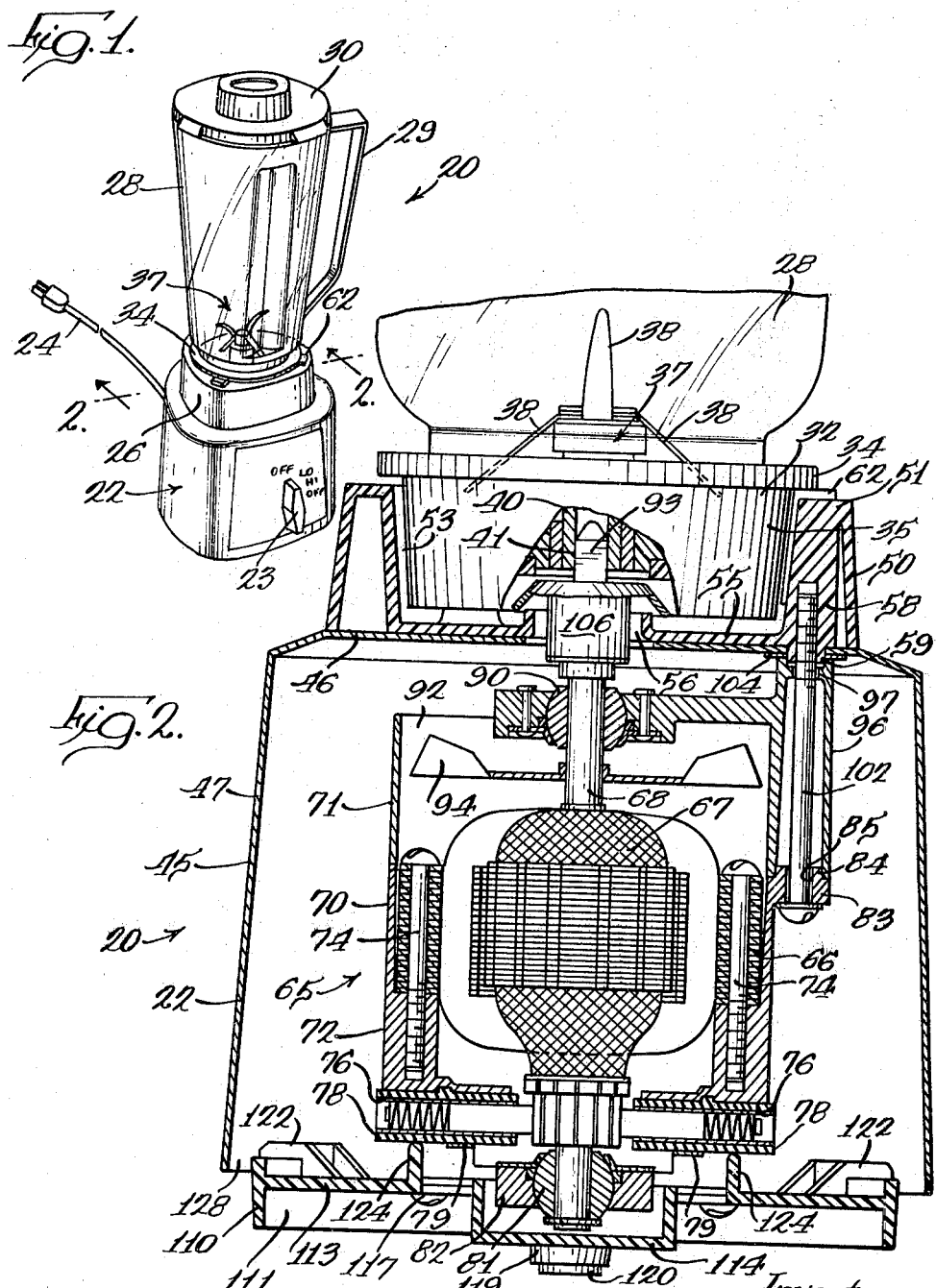
FIG. 1 is a perspective view of an electric blender embodying the present invention wherein a portion of the power cord is broken away for convenience of illustration.
FIG. 2 is an enlarged, fragmentary sectional view taken substantially on line 2—2 of FIG. 1.

Referring now to the drawing wherein like reference characters designate corresponding parts throughout the several views, there is shown an electric blender generally designated by reference numeral 20. The blender 20 includes a base 22 having an electrical control switch knob 23 secured on its front and an electric power cord 24 emanating from the rear. Mounted on top of the base 22 is a holder 26 which is adapted for supporting a mixing vessel 28. To facilitate the removal of the mixing vessel 28 from the holder 26, there is provided a vessel handle 29 which is also helpful in pouring the contents from the vessel. Closing the top of the vessel is a standard enclosure 30. The bottom of the mixing vessel 28 is enclosed by a removable bottom cap 32 having an annular radially extending horizontal flange 34 and a conical side wall 35. One of the primary purposes of the bottom cap 32 is to rigidly support the agitator assembly 37 having a plurality of blades 38 disposed within the lower portion of the vessel for mixing and comminuting the contents thereof and a drive shaft 40 to which the blades 38 are securely fastened. The bottom of the agitator shaft 40 is hollow and is formed with a driven socket 41 disposed for being in driving relationship with the source of power disposed within base 22.

Figure 3:
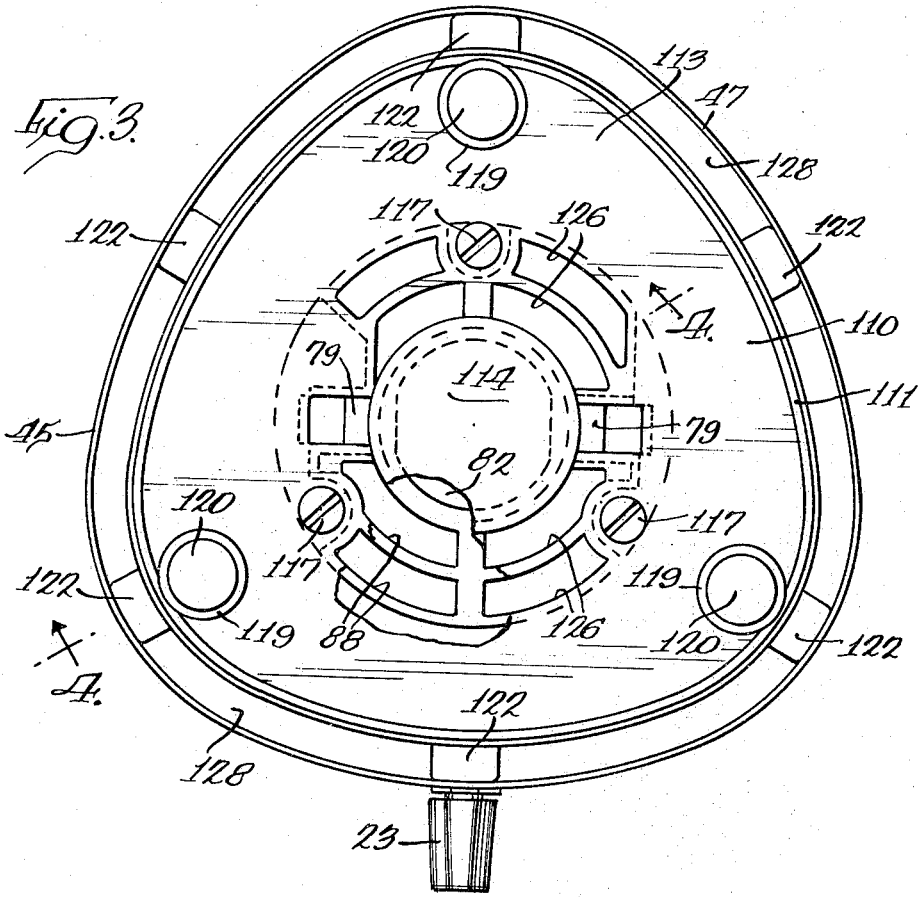
FIG. 3 is a bottom plan view of the subject blender with a portion of the bottom plate cut away in order to reveal a portion of the motor housing.

As may be conveniently seen in FIGS. 2 and 3, the base 22 includes an inverted, cup-shaped base cover 45 which is preferably fabricated from relatively inexpensive, thin sheet metal. The cover 45 has a substantially upper horizontal wall 46 and an annular slightly tapered side wall 47 which in the horizontal section has a curved, triangular configuration. For improving the attractiveness of the base cover 45, it is preferably plated on its outer surface and gives an outward appearance of being a massive, strong member. However, it should be appreciated that due to the thinness of the sheet material used to form the base cover 45, it is resilient and easily fixed if left unsupported.

Situated on top of the base cover horizontal wall 46 is the holder 26 preferably formed from a suitable plastic material which is an electrical non-conductor. The holder 26 is formed having an outer wall 50 with somewhat the same configuration as the base cover side wall 47, a roof 51, an internal tapered annular wall 52 and an internal horizontal floor 55 formed with an aperture 56 at its center. A cavity 53 is defined by the holder wall 52 and floor 55 and is adapted to receive the vessel bottom cap 32. Contiguous with the internal wall 52 are vertically oriented mounting posts 58 provided at their bottom with downwardly extending, cylindrically-shaped extensions 59 which pass through the base cover upper wall 46. Attached to and spaced along the holder of 51 are a plurality of resilient pads 62 so that when the mixing vessel 28 is supported by holder 26, the bottom cap 32 extends into the holder cavity 53 until the bottom cap horizontal flange 34 rests on top of the pads 62. The cavity 53 is formed and the pads 62 are separated so that the bottom cap 32 can move laterally within the cavity. Although the bottom cap 32 has freedom to move laterally, its vertical disposition is accurately controlled by the engagement between the pads 62 and flange 34. However, it should be appreciated that the relationship between the vessel bottom cap 32 and the holder cavity 53 is such that the agitator shaft socket 41 is approximately centrally located within the cavity and disposed above the holder floor aperture 56.

Providing power to rotate the agitator assembly 37 is an electric motor 65 disposed within the base cover 45. The electric motor 65 includes a conventional stator 66 and a vertically disposed rotor 67 mounted on rotor shaft 68 positioned within motor housing 70 defined by an upper section 71 and a lower section 72. As may be conveniently viewed in FIG. 2, the stator 66 is bolted to the lower housing section 72 by a plurality of screws 74. Preferably, the motor housing 70 is formed from aluminum die castings, and the lower housing section 72 is cast with a pair of opposed downwardly open channels 76 for receiving brush holders 78 which are held in place by a suitable spring clip 79. The lower end of rotor shaft 68 is rotatably supported by a sleeve bearing 81 which is pivotally secured in a bottom portion 82 of lower housing section 72. Near the top of the lower housing section 72 are a plurality of radially extending mounting bosses 83 each having an upwardly extending guiding ring 84 through which an opening 85 extends. As can be seen in FIG. 3, the lower housing section 72 is cast with a plurality of air inlet openings 88 affording access for cooling air to enter into the bottom of housing 70. The upper housing section 71 is provided at its upper end with a sleeve bearing 90 through which the rotor shaft 68 extends. Located at the upper end of rotor shaft 68 is a driver 93 which is adapted to make a power transmitting engagement with the agitator shaft driven socket 41. In furtherance of the flow of cooling air, the upper section 71 is cast with a plurality of outlet air openings 92, one of which is shown in FIG. 2 for permitting the egression of cooling air from the top of housing 70.

For forcing the cooling air upwardly through the housing 70, a fan 94 is secured to the rotor shaft 68 between the bearing 90 and the rotor 67. Therefore, when the motor 65 is energized, the rotor 67 rotates causing the fan 94 to draw air through the lower housing section openings 88, past the stator 66 and rotor 67 and out the upper housing section openings 92. Cast along the periphery of the upper housing section 71 are spaced, upwardly extending, hollow columns 96 which are oriented to coincide with lower section mounting bosses 83. The upper end of each column 96 is recessed to form a shoulder 97.

For the purpose of rigidly locking the upper and lower motor housing sections together and also to rigidly lock the motor housing to the holder 26, fastening bolts 102 extend through the lower section boss openings 85 and upper section columns 96 and anchor to the holder mounting post 58. Once the bolts 102 are firmly in place, the housing is rigidly held together, and it, in turn, is rigidly anchored to the holder so that the driver 93 is fixed with relationship to the holder cavity 53. Furthermore, the tightening of bolts 102 sandwiches the base cover horizontal wall 46 between the motor housing 70 and the holder 26. To electrically insulate the housing 70 from the base cover 45, insulating washers 104 are disposed between the upper end of columns 96 and the base cover wall 46. It should also be appreciated that the holder 26, upper section 71 and lower section 72 are rigidly held together against lateral and rotational movement by virtue of the lower section guiding ring 84 being nested within the upper section column 96 and the holder mounting post extension 59 being received within the upper section column shoulder 97. Preferably, driver 93 is made from a strong metal and is electrically insulated from the rotor shaft 68 by a suitable insulating member 106 which, additionally, has resilient qualities for absorbing any impact imposed upon the agitator assembly 37.

Figure 4:
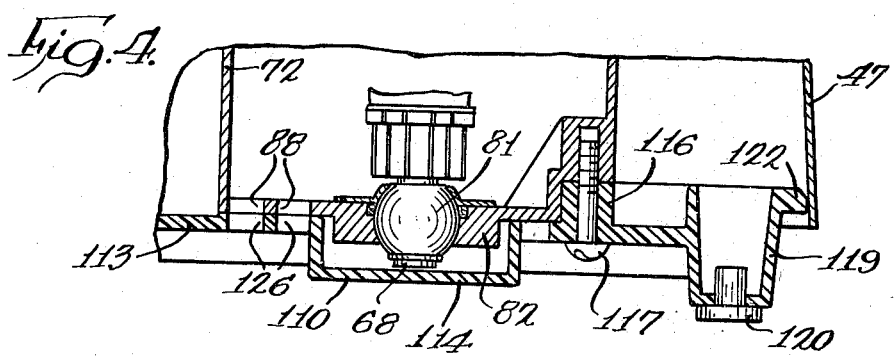
FIG. 4 is a fragmentary sectional view taken substantially on line 4—4 of FIG. 3 assuming that FIG. 3 shows the complete structure.

Enclosing the bottom of cup-shaped base cover 45 is a bottom plate 110 preferably molded from a suitable plastic which does not conduct electricity. The bottom plate 110 is molded having a vertically extending annular rim 111 which is spaced inwardly from the bottom of base cover side walls 47 and extends slightly therebelow. Extending inwardly from the annular rim 111 having substantially complementary profile to the base cover side wall 47 is a horizontal wall 113 formed at its center with a recessed section 114 to accommodate the bottom portion 82 of the lower housing section 72 and the bottom of rotor shaft 68. The horizontal wall 113 is provided with a plurality of upwardly extending bosses 116 through which screws 117 pass to rigidly lock the bottom plate 110 to the bottom of the lower motor housing section 72. To support the blender 20, the bottom plate 110 is molded with a plurality of downwardly extending feet 119, at the bottom of which are suitable rubber cushions 120. In order to add rigidity to the thin base cover side wall 47, the bottom plate 110 has a plurality of outwardly extending integral projections 122 which engage the side wall 47 and subject it to outwardly directed force since there is a slight interference fit between the projections 122 and the side wall 47. With this construction for supporting the base cover near the bottom of the side wall 47 and at the same time rigidly clamping the upper horizontal wall 46 between the electric motor housing 47 and the holder 26, the cover 45, while formed of relatively thin material, is held rigidly and gives the impression that it is more massive and expensive. To insure that the brush holders 78 do not come out of lower motor housing section channels 76 due to a malfunction or loosening of spring clip 79, the bottom plate 110 is formed with upwardly extending protuberances 124 which are located immediately below the brush holders. Thus, when the bottom plate 110 is secured to the lower motor housing section 72 by means of screws 117, the protuberances 124 lock the brush holders 78 within the lower section brush channels 76. Permitting the ingression of cooling air into the motor housing 70 through the lower motor housing section openings 88, the bottom plate 110 is provided with a plurality of inlet openings 126 which are arranged to be in alignment with the lower section openings 88 as can be seen in FIG. 4. It should be appreciated that the bottom plate horizontal wall 113 abuts against the bottom of lower motor housing section 72 so that the air passing through bottom plate openings 126 must pass through housing openings 88, and consequently, the incoming air cannot pass along the outside of the motor housing 70. As seen in FIG. 2, the bottom plate rim 111 is spaced from the base cover side wall 47 to form an outlet opening 128. Therefore, the flow path of cooling air is upwardly through bottom plate openings 126, through lower section openings 88 past the rotor 67 and stator 66 thereby cooling the same, out opening 92 in the upper housing section 71 and then downwardly past the outside of motor housing 70 to egress through outlet opening 128. For the cooling air to be most effective, there should be a minimum of recirculation of the air egressing through outlet opening 128 entering immediately into inlet bottom plate opening 126. To deter this recirculation, the bottom plate rim 111 extends downwardly a sufficient distance to direct the egressing air away from the inlet opening 126.

From the above, it should be apparent that the present blender has a simple design using inexpensive materials and is easily manufactured. There is no need for an expensive construction to mount the driver in a floating manner in order to insure the alignment between the driver and the agitator assembly in the mixing vessel. In the present blender, the driver is fixedly positioned with respect to the holder. Furthermore, there is no necessity for accurately mating the mixing vessel bottom cap to the holder cavity since, according to the present construction, the bottom cap is permitted limited lateral movement so that the agitator assembly may be easily brought into power transmitting engagement with the fixedly positioned driver. The base cover, which is normally an expensive part to manufacture, is in the present blender relatively inexpensive and made from thin sheet metal. The base cover merely performs a decorative function as well as enclose the internal mechanism of the blender but does not support the motor, vessel holder or bear the weight of the blender itself. A still further advantage of the present design is that repairs may be easily made since the major components can be easily disassembled by simply removing a few screws. Even though the present blender is inexpensively manufactured, provision has been made in the design to double insulate the electric motor from the exposed parts which the user can come into contact with.

What is considered new and desired to be secured by Letters Patent of the United States is:

1. An electrically operated blended comprising an inverted cup-shaped base cover being provided with a substantially horizontal upper wall, an electric motor enclosed within said base cover and having a driver extending upwardly through said wall, said electric motor being positioned in a motor housing with said driver being rotatably supported in vertically spaced bearing mounted in said housing, a holder being disposed on top of said wall and defining a cavity into which said motor driver extends, a mixing vessel provided with a bottom cap which is receivable within said holder cavity and which supports an agitator means whereby said driver is in power transmitting relationship for rotating said agitator means when said bottom cap is disposed within said holder cavity, fastening means rigidly locking said motor housing directly to said holder with said wall clamped therebetween.

2. The electrically operated blender of claim 1 wherein said holder and bottom cap are oriented so that said bottom cap can move laterally with respect to said driver in order for permitting said agitator means to be in proper power transmitting alignment with said driver.

3. The electrically operated blender of claim 1 wherein said holder being formed of electrically insulating material, electrically insulating means between said motor housing and said base cover whereby said motor is not in electrical contact with said base cover.

4. The electrically operated blender of claim 3 including an electrically insulating bottom plate attached to said motor housing and enclosing the bottom of said cup-shaped base cover, said plate disposed for supporting said blender and electrically insulating said motor from said base cover.

5. The electrically operated blender of claim 1 including a bottom plate rigidly attached to said motor housing and enclosing the bottom of said cup-shaped base cover, said plate provided with means for supporting said blender.

6. The electrically operated blender of claim 1 wherein said motor housing comprising an upper and lower section, said fastening means locking said housing sections together in assembled relationship and locking said upper section to said holder.

7. The electrically operated blender of claim 6 including a bottom plate attached to said lower motor housing section and enclosing the bottom of said cup-shaped base cover whereby said plate is disposed to support said blender.

8. In an electric blender comprising an inverted cup-shaped base cover formed of relatively thin sheet metal whereby it does not possess great rigidity, an electric motor having a rigid and strong housing disposed within said base cover, a holder for receiving a mixing vessel positioned on top of said base cover, fastening means extending directly between and rigidly anchoring said motor housing to said holder so that said base cover is clamped therebetween, a bottom plate attached to said motor housing and extending horizontally to enclose the bottom of said cup-shaped base cover and to support cover thereby giving it horizontal rigidity.

9. In the electric blender of claim 8 wherein said bottom plate is provided with a plurality of spaced radially extending projections which engage said base cover near its bottom end so that said cover remains in a given shape.

10. In the electric blender of claim 9 wherein said bottom plate has a plurality of spaced downwardly extending feet for supporting said blender.

11. In the electric blender of claim 8 wherein said motor housing having opposed downwardly open channels for receiving electrical brushes therein, said bottom plate formed with upwardly projecting protuberances in alignment with said housing channels for retaining the brushes therein.

12. An electric blender comprising a base cover enclosing an electric motor having a driver extending upwardly through said cover, a holder mounted on top of said cover and said motor rigidly anchored to said holder so that said driver is fixedly positioned with respect to said holder, a mixing vessel containing an agitator means and being receivable in a cavity by said holder, the portion of said vessel extending into said holder cavity being smaller than said holder cavity in the lateral direction so that said vessel can move laterally with respect to said holder while supported thereon whereby said agitator means can be aligned with said driver for a power transmitting engagement.

13. The electric blender of claim 12 wherein said vessel is provided with a horizontally extending flange which is adapted to rest on top on said holder so that the depth of penetration of said vessel into said holder cavity is limited.

References Cited

UNITED STATES PATENTS

| | | | |
|---|---|---|---|
| 2,733,396 | 1/1956 | Luther | 259—108 X |
| 2,822,485 | 2/1958 | Braun | 259—108 X |
| 3,064,949 | 11/1962 | Dewenter | 259—108 |
| 3,175,594 | 3/1965 | Jepson | 259—108 X |

ROBERT W. JENKINS, Primary Examiner

UNITED STATES PATENT OFFICE
CERTIFICATE OF CORRECTION

Patent No. 3,493,214                         February 3, 1970

Margaret M. Edwards et al.

It is certified that error appears in the above identified patent and that said Letters Patent are hereby corrected as shown below:

Column 1, line 36, "seriving" should read -- serving --. Column 3, line 38, "fixed" should read -- flexed --; line 52, "of 51" should read -- roof 51 --. Column 5, line 75, "blended" should read -- blender --. Column 6, line 55, "support cover" should read -- support said cover --. Column 7, line 2, "cavit by" should read -- cavity formed by --.

Signed and sealed this 1st day of December 1970.

(SEAL)
Attest:

Edward M. Fletcher, Jr.                      WILLIAM E. SCHUYLER, J

Attesting Officer                              Commissioner of Patent